United States Patent [19]

Oppmann et al.

[11] Patent Number: 5,662,135
[45] Date of Patent: Sep. 2, 1997

[54] IRRIGATION CONTROL BYPASS APPARATUS AND METHOD

[75] Inventors: Arthur L. Oppmann, Berlin; John F. Oppmann, Delran; Charles S. Siedlecki, Berlin, all of N.J.

[73] Assignee: Arthur's Landscaping & Garden Center Inc., Atco, N.J.

[21] Appl. No.: 682,082

[22] Filed: Jul. 16, 1996

[51] Int. Cl.$^6$ .................................. F17D 3/00; G05D 7/06
[52] U.S. Cl. ......................... 137/1; 137/624.12; 239/70
[58] Field of Search .......................... 137/624.12, 624.11, 137/1; 239/70, 69

[56] References Cited

U.S. PATENT DOCUMENTS

| | | |
|---|---|---|
| 3,869,854 | 3/1975 | Church . |
| 4,004,612 | 1/1977 | Hummel, Jr. et al. . |
| 4,189,776 | 2/1980 | Kendall . |
| 4,526,198 | 7/1985 | Scott . |
| 4,548,225 | 10/1985 | Busalacchi . |
| 4,785,843 | 11/1988 | Nicholson . |
| 4,934,400 | 6/1990 | Cuming . |
| 5,139,044 | 8/1992 | Otten et al. . |
| 5,154,349 | 10/1992 | Vaughn ................................ 239/70 X |
| 5,375,617 | 12/1994 | Young ........................... 137/624.12 X |
| 5,445,176 | 8/1995 | Goff . |

*Primary Examiner*—Kevin Lee
*Attorney, Agent, or Firm*—Thomas A. Lennox, Esq.; James J. Murtha, Esq.

[57] ABSTRACT

To solve the problem of the missing homeowner when the residential irrigation system needs the annual start-up or winterizing, electrical connection is made between the standard irrigation timing control unit located inside a building with an irrigation control bypass apparatus attached on an outside surface of the building, the apparatus including a terminal strip in the housing with connector lugs for each of the electrical lines to irrigation zones, sockets connected to reduced amperage current supplied by the timing control unit, and jumper wires to alternatively connect the socket means with a chosen lug on the terminal strip to open the corresponding water line to the irrigation zone.

7 Claims, 3 Drawing Sheets

5,662,135

IRRIGATION CONTROL BYPASS APPARATUS AND METHOD

BACKGROUND OF THE INVENTION

This invention involves an electrical bypass apparatus and meethod specifically directed to use in irrigation control systems.

Automatic irrigation systems for outdoor landscapes have become quite commonplace. Whether it is for commercial or residential property, the basic elements of the system are very similar. The landscape field is separated into zones which are each irrigated by a plurality of water distribution outlets including sprinkler heads, drip tubes, and the like. Each of the outlets for a particular zone is connected by plastic pipe in a zone pipe line to an automatic valve. This valve is actuated by a reduced amperage electrical current, such as a common twenty-four volt system. Electrical wires lead back to a building on the premises through an outer wall to an irrigation timing control device that is located inside the building. Such devices are described in U.S. Pat. Nos. 4,526,198 to Scott and 4,189,776 to Kendall, incorporated herein by reference thereto. These devices provide current to the electrically operated automatic valves in the field at preset times for preset intervals. These devices also typically include a testing mode where the zones are turned on for short periods of time for testing purposes. Internally, the devices include a transformer with reduced amperage connection points and electrical connection points corresponding to each of the zone valves.

Where the climate of the location of the field includes freezing weather, it is necessary to blow out the system in the fall, removing water from the lines and the valves to prevent winter freeze damage. In the spring, it is necessary to turn the system on again and check for any damage, leaks, or worn out equipment, such as the sprinkler heads. These fall and spring services are usually provided by third party individuals who are usually in the landscaping business and may have originally installed the irrigation system. Since the irrigation timing control device is inside a building, commonly in a garage for a residential property, the person coming for the winterization step or the spring turn-on must a have access to the inside of the building. In today's society, fewer and fewer people are home during normal weekday working hours. While in some cases the homeowner will leave the garage door unlocked or leave a key with a neighbor, this arrangement is becoming less and less frequent. Further, homeowners frequently forget appointments made for servicing and due to either forgetfulness or last minute emergencies, it is increasingly common for the servicing company to make two or more trips to each home before they can gain access to the irrigation timing control device. A major amount of time is spent attempting to make appointments and managing the schedule to fit the homeowner's schedule and adjust to changes that occur. A possible answer is to locate the buried valves and actuated them directly for testing purposes. That is not practical in that locating the valves can be very difficult and, in many cases, the servicing company is not the original installer. The basic problem is that with present systems, someone must be home for the winterization and spring turn-on procedures.

None of the following devices appropriately address the problems described above. In U.S. Pat. No. 3,869,859 to Church, a solid state electronic, timing, and cycling device is provided to automatically program the operation of all types of systems designed to distribute water for irrigation and the like. The Church control device includes an independent overriding circuit to operate one station without interring with the program. The Scott patent referred to above, describes an irrigation controller unit with an override switch inside the unit. In U.S. Pat. No. 5,139,044 to Otter et al, a fluid control system is described using a computer to override and reprogram the irrigation parameters. In U.S. Pat. No. 4,548,225 to Busalacchi an irrigation control system is described which, during an emergency override situation, all non-essential irrigations are shut down. In U.S. Pat. No. 4,004,612 to Hummel, Jr., et al, a remote control system for large-area sprinkler systems is disclosed using an AC coded signal superimposed upon the control circuit to permit anyone of a large number of sprinklers to be selectively operated and to control any selected operative sequence for the sprinklers. In U.S. Pat. No. 4,785,843 to Nicholson, a multiplexed automatic control system with a moisture sensor controlling each solenoid controlled water sprinkler valve. An irrigation control system is described in U.S. Pat. No. 4,934,400 to Cuming, namely a soil moisture sensor system capable of measuring moisture for both shallow and deep rooted plants. In U.S. Pat. No. 5,445,176 to Goff, a moisture sensitive irrigation valve control system is described which overrides the normal programmed irrigation cycle.

None of these devices and systems are directed to or satisfy the needs described above, nor attain the objects described herein below.

SUMMARY OF INVENTION

It is an object of the protection sought to provide an apparatus and a method which does not require that someone be home in order to winterize and turn on the landscape irrigation system.

It is a particular object of the protection sought to provide a system and method by which a person can open the valves of a chosen zone in the irrigation system without entering the premises on the property.

It is an additional object of the protection sought to provide a system and method that allows for simple and easily understood overriding of the turned off irrigation timing control device inside the building and allow the irrigation piping and sprinkler system to be serviced without affecting the controlling unit in any way whatsoever.

It is a particular object of the protection sought to provide a bypass unit on an outside wall, preferably close to and opposite the controlling apparatus that is located on the inside of that wall which allows the person servicing the irrigation system to turn on any chosen zone valve to test and operate the system.

It is a specific object of the protection sought to save the substantial lost time in missed appointments, scheduling difficulties, and out-of-pocket costs which are required when entrance to the building is required to service the irrigation system.

It is a further particular object of the protection sought to provide a bypass unit on an outside wall connectable to the field valves that may utilize a portable source to turn on any chosen valve.

An aspect of the invention is an irrigation control bypass apparatus for use in a multiple zoned irrigation field system. The system on which the invention is to be used includes a plurality of water pipe lines connected to a main water source, a plurality of valve means on each to open and close said pipe lines, and a plurality of valve actuation means one each connected to each of said valve means to alternatively open and close said valve means upon receiving electrical current along separate electrical lines from an irrigation timing control means located inside a building with an outside wall. The irrigation timing control means provides said current at preset time intervals to said separate electrical lines. The irrigation timing control means includes power source connection point means, connection to which provides a source of reduced amperage electrical current, and a plurality of electrical connectors including one for each of said electrical lines capable of conducting electrical currant to the separate electrical lines. The irrigation control bypass apparatus of the present invention for use with the above system includes a housing adapted to be attached on an outside surface of the outside wall of the building, at least one terminal strip in the housing including a plurality of electrical connector lugs, one lug for each of said electrical lines, and wire means adapted to electrically connect the lugs on the terminal strip to each electrical connector in the irrigation timing control means. The irrigation control bypass apparatus further includes socket means in the housing to provide connection to said reduced amperage current and second wire means adapted to electrically connect said socket means to said power source connection point means in the irrigation timing control means. The irrigation control bypass apparatus further includes jumper wire means adapted to alternatively electrically connect the socket means with a chosen lug on the terminal strip corresponding to a water line to conduct current and actuate the chosen valve actuation means to open the corresponding water line.

It is preferred that the lugs be visually marked to identify individual valve actuation means. It is also preferred that the wire means further include a common wire which when coupled with individual wires for each valve actuation means and connected to a power source by the jumper wire means actuates the individual valve actuation means of choice. It is further preferred that there be two terminal strips in the housing each including a plurality of electrical connector lugs, one lug for each of said electrical lines and a common lug also electrically connected to the irrigation timing control means. It is further preferred that the socket means include an aligned pair of female sockets and the jumper wire means comprises a pair of wires with a male plug adapted to fit into said female sockets on one end and alligator clips on an other end adapted to clip onto a chosen lug and a common line. It is more preferred that the socket means include a single female socket and the jumper wire means include a wire with a male plug adapted to fit into said female socket on one end and an alligator clip on an other end adapted to clip onto a chosen lug.

Another aspect of the invention is a method of bypassing and testing a multiple zoned irrigation field system. The system to be bypassed includes a plurality of water pipe lines connected to a main water source, a plurality of valve means on each to open and close said pipe lines to supply water to water distribution means connected to said line to irrigate an area of said field, and a plurality of valve actuation means one each connected to each of said valve means to alternatively open and close said valve means upon receiving electrical current along separate electrical lines from an irrigation timing control means located inside a building with an outside wall. The irrigation timing control means provides said current at preset time intervals to said separate electrical lines and includes power source connection point means, connection to which provides a source of reduced amperage electrical current, and a plurality of electrical connectors comprising one for each of said electrical lines capable of conducting electrical currant to the separate electrical lines. The method includes providing an irrigation control bypass apparatus that includes a housing, at least one terminal strip in the housing including a plurality of electrical connector lugs, one lug for each of said electrical lines, a plurality of first wires electrically connected to each of the lugs on the terminal strip with free ends extending out of the housing, socket means in the housing to provide connection to said reduced amperage current, and a second wire electrically connected to said socket means with a free end extending out of the housing. The method further includes attaching the housing on an outside surface of the outside wall of the building, preferably the same wall on which the irrigation timing control means is attached on the inside of the building. The method further includes electrically connecting each free end of the first wires to each electrical connector in the irrigation timing corresponding to a visually marked lug on a terminal strip identifying the corresponding electrical line and electrically connecting the free end of the second wire to the power source connection point means in the irrigation timing control means. The method further includes providing jumper wire means adapted to alternatively electrically connect the socket means with a chosen lug on a terminal strip. The method then includes connecting said jumper wire means to the socket means and to a chosen lug corresponding to an electrical line to conduct current and actuate the chosen valve actuation means to open the corresponding water line to test the water distribution means supplied by said water line.

DESCRIPTION OF PREFERRED EMBODIMENTS

Figure 1:
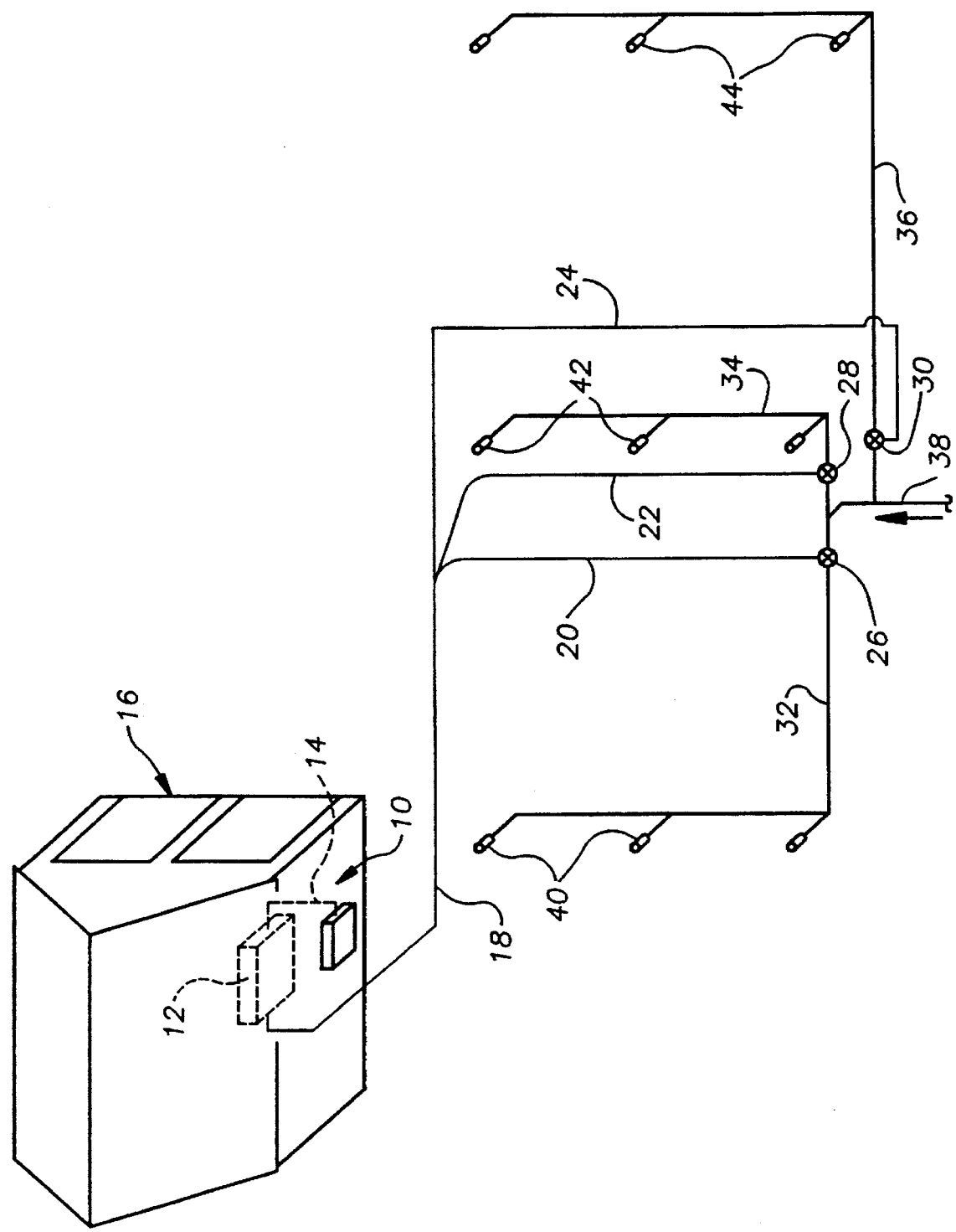
FIG. 1 is an overhead perspective diagram of a landscape irrigation system to which an irrigation control bypass apparatus of the present invention is installed.
Figure 2:
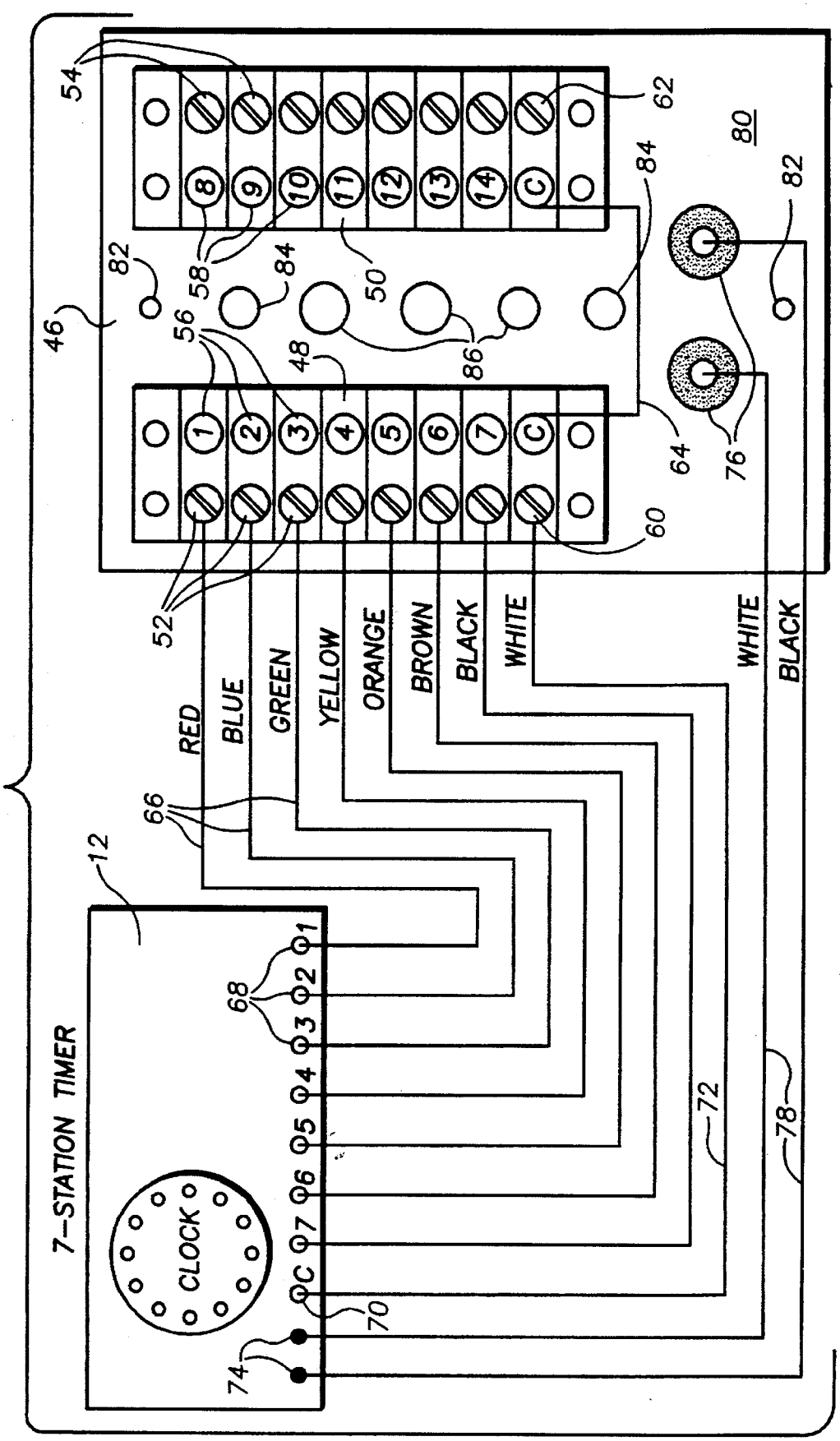
FIG. 2 is a circuit diagram of the connection of said apparatus to a seven station timer of said landscape irrigation system.
Figure 3:
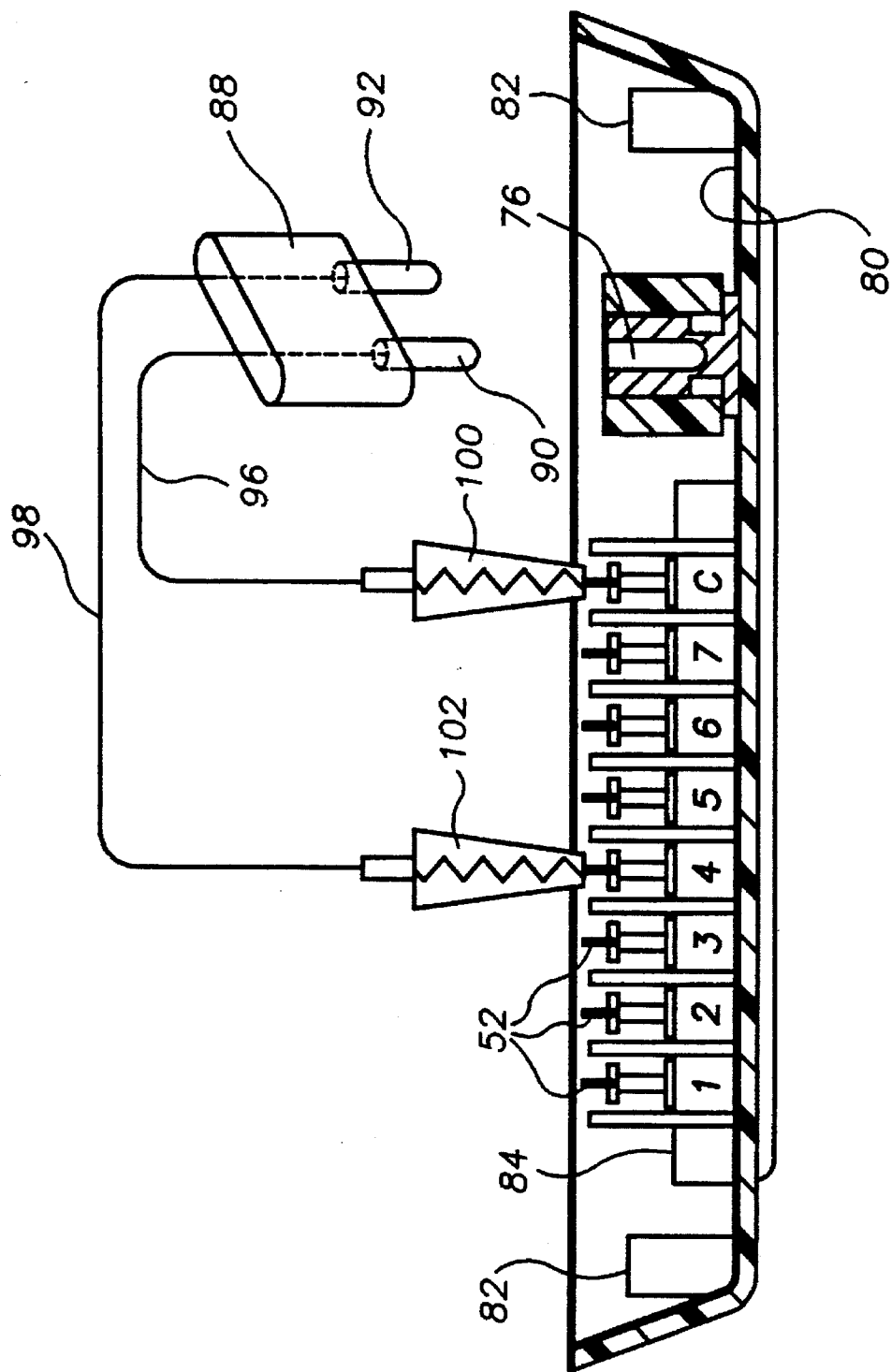
FIG. 3 is a vertical cross-sectional view of said apparatus illustrated in FIGS. 1 & 2 rotated ninety degrees with a wire harness connector shown to activate a chosen zone valve in the landscape irrigation system.

Irrigation control bypass apparatus 10 is shown installed in a landscape irrigation system in FIG. 1. Apparatus 10 is a version of the invention capable of being powered by an external portable power source connected to power connectors 76 in unit 46. Apparatus 10 is particularly useful when the house current has been turned off while the irrigation system has to be checked, such as prior to a real estate closing. A simpler version of the invention is a unit that requires that the power be available in the controller unit inside the residence. The simpler version utilizes a single wire connection from the "hot" black connector of connectors 74 in unit 12 to a single female plug connector to replace power connectors 76 in bypass unit 10. A single "banana" plug jumper is used to connect the power connector with an alligator clip to a chosen valve line to activate the chosen valve. Apparatus 10 is installed on the outside of a wall of building 16 connected by wire bundle 14 to irrigation controller unit 12 installed on the inside of the same wall of building 16. Controller unit 12 includes a transformer and controls the irrigation field through wire bundle 18 which includes control wires 20, 22 and 24, which are connected to electrically operated twenty-four volt solenoid valves 26, 28 and 30, which open and close zone water pipe lines 32, 34, and 36, respectively, which supply water from main water line 38 to sprinkler head groups 40, 42 and 44, which represent three separate zones. As diagrammmed in FIG. 2, bypass unit 46 of apparatus 10 includes two eight position terminal strips 48 and 50, each capable of providing terminal connectors for seven zones. Strips 48 and 50 each have seven threaded wire connector lugs 52 and 54, respectively, and numerical label designations one through seven 56 and eight through fourteen 58, respectively, referring to the respective zones. The eighth threaded wire connector lug on each terminal strip, 60 and 62, are connected by wire 64 to provide a common connecting means marked "C". Connector wires 66 connect connector lugs 52 and 54 with each respective zone connection points 68 in unit 12, each of which are capable of delivering power to the respective zone valve. Wire connector 72 connects common zone line connection point in unit 12 with lug 60 in unit 46. Since providing current to point 60 and any chosen point 68 provides current to a chosen zone valve, the connection the wires of unit 46 now allows providing current to any chosen zone valve by providing current to a combination of lugs 60 or 62 and the lug corresponding to the chosen zone valve. Electrical power is provided to unit 46 from transformer power connector points 74 in unit 12 by connector wires 78 connected to female plug power connectors 76 in unit 46. All of the above elements in unit 12 are attached to rear panel 80, to which a cover panel is attached through assembly holes 82. Panel 80 is attached to an outside wall by screws through holes 84 and all of the wires from unit 12 enter unit 46 through grommeted holes 86 through panel 80. When apparatus 10 is to be used the cover is removed exposing panel 80 as illustrated in FIG. 3. Prongs 90 and 92 of dual pronged "banana" plug 88 are plugged into sockets 76 providing current to wires 96 and 98 on which are connected alligator clips 100 and 102. One of these clips is clipped onto common connectors 60 or 62 and the other on the chosen zone connector lug, such as the one for zone four as shown in FIG. 3.

While this invention has been described with reference to specific embodiments disclosed herein, it is not confined to the details set forth and the patent is intended to include modifications and changes which may come within and extend from the following claims.

We claim:

1. An irrigation control bypass apparatus for use in a multiple zoned irrigation field system, the system comprising:

(A) a plurality of water pipe lines connected to a main water source, (B) a plurality of valve means on each to open and close said pipe lines, and (C) a plurality of valve actuation means one each connected to each of said valve means to alternatively open and close said valve means upon receiving electrical current along separate electrical lines from an irrigation timing control means located inside a building with an outside wall, said irrigation timing control means to provide said current at preset time intervals to said separate electrical lines, said irrigation timing control means comprising:

(i) power source connection point means, connection to which provides a source of reduced amperage electrical current, and (ii) a plurality of electrical connectors comprising one for each of said electrical lines capable of conducting electrical currant to the separate electrical lines, the irrigation control bypass apparatus comprising:

(a) a housing adapted to be attached on an outside surface of the outside wall of the building, (b) at least one terminal strip in the housing comprising a plurality of electrical connector lugs, one lug for each of said electrical lines, (c) wire means adapted to electrically connect the lugs on the terminal strip to each electrical connector in the irrigation timing control means, (e) socket means in the housing to provide connection to said reduced amperage current, (f) second wire means adapted to electrically connect said socket means to said power source connection point means in the irrigation timing control means, and (g) jumper wire means adapted to alternatively electrically connect the socket means with a chosen lug on the terminal strip corresponding to a water line to conduct current and actuate the chosen valve actuation means to open the corresponding water line.

2. The irrigation control bypass apparatus of claim 1 wherein the lugs are visually marked to identify individual valve actuation means.

3. The irrigation control bypass apparatus of claim 1 wherein the wire means further comprises a common wire which when coupled with individual wires for each valve actuation means and connected to a power source by the jumper wire means actuates the individual valve actuation means of choice.

4. The irrigation control bypass apparatus of claim 1 wherein there are two terminal strips in the housing each comprising a plurality of electrical connector lugs, one lug for each of said electrical lines and a common lug also electrically connected to the irrigation timing control means.

5. The irrigation control bypass apparatus of claim 1 wherein the socket means comprises an aligned pair of female sockets and the jumper wire means comprises a pair of wires with a male plug adapted to fit into said female sockets on one end and alligator clips on an other end adapted to clip onto a chosen lug and a common line.

6. The irrigation control bypass apparatus of claim 1 wherein the socket means comprises a single female socket and the jumper wire means comprises a wire with a male plug adapted to fit into said female socket on one end and an alligator clip on an other end adapted to clip onto a chosen lug.

7. A method of bypassing and testing a multiple zoned irrigation field system, the system comprising:

(A) a plurality of water pipe lines connected to a main water source, (B) a plurality of valve means on each to open and close said pipe lines to supply water to water distribution means connected to said line to irrigate an area of said field, and (C) a plurality of valve actuation means one each connected to each of said valve means to alternatively open and close said valve means upon receiving electrical current along separate electrical lines from an irrigation timing control means located inside a building with an outside wall, said irrigation timing control means to provide said current at preset time intervals to said separate electrical lines, said irrigation timing control means comprising:

(i) power source connection point means, connection to which provides a source of reduced amperage electrical current, and (ii) a plurality of electrical zone connection points comprising one for each of said electrical lines capable of conducting electrical currant to the separate electrical lines, the method comprising:

(a) providing an irrigation control bypass apparatus comprising:
  (i) a housing,
  (ii) at least one terminal strip in the housing comprising a plurality of electrical connector lugs, one lug visually marked identifying each of said electrical lines,
  (iii) a plurality of first wires electrically connected to each of the lugs on the terminal strip with free ends extending out of the housing,
  (iv) socket means in the housing to provide connection to said reduced amperage current, and
  (v) a second wire electrically connected to said socket means with a free end extending out of the housing,
(b) attaching the housing on an outside surface of the outside wall of the building,
(c) electrically connecting each free end of the first wires to each electrical zone connection points in the irrigation timing control means corresponding to a marked lug on the terminal strip,
(d) electrically connecting the free end of the second wire to said power source connection point means in the irrigation timing control means,
(e) providing jumper wire means adapted to alternatively electrically connect the socket means with a chosen lug on a terminal strip, and
(f) connecting said jumper wire means to the socket means and to a chosen lug corresponding to an electrical line to conduct current and actuate the chosen valve actuation means to open the corresponding water line to test the water distribution means supplied by said water line.

* * * * *